United States Patent [19]

Dansereau et al.

[11] Patent Number: 5,058,827
[45] Date of Patent: Oct. 22, 1991

[54] SUPER DEBRIS DEFLECTOR

[75] Inventors: Michel Dansereau, Redondo Beach; Lawrence S. McBee, Torrance, both of Calif.

[73] Assignee: McDonnell Douglas Corporation, Long Beach, Calif.

[21] Appl. No.: 447,438

[22] Filed: Dec. 7, 1989

[51] Int. Cl.⁵ .............................................. B64C 25/32
[52] U.S. Cl. .......................... 244/103 R; 244/100 R; 280/851
[58] Field of Search ............... 244/100 R, 103 R, 108; 280/851, 157, 156

[56] References Cited

U.S. PATENT DOCUMENTS

| 2,782,053 | 2/1957 | Long | 280/851 |
|---|---|---|---|
| 3,198,545 | 8/1965 | McDaniel | 280/851 |
| 3,350,114 | 10/1967 | Salisbury | 280/851 |
| 3,724,871 | 4/1973 | Evans | 280/851 |
| 4,290,619 | 9/1981 | Goodall | 280/851 |
| 4,382,606 | 5/1983 | Lightle et al. | 280/851 |
| 4,389,029 | 6/1983 | Glasenapp et al. | 244/103 R |
| 4,408,736 | 10/1983 | Kirschbaum et al. | 244/100 R |
| 4,796,906 | 1/1989 | Sullivan | 280/851 |

Primary Examiner—Joseph F. Peters, Jr.
Assistant Examiner—Christopher P. Ellis
Attorney, Agent, or Firm—Donald E. Stout; Gregory A. Cone; John P. Scholl

[57] ABSTRACT

A vertically mounted deflector attached to a landing gear, that prevents debris from being thrown by the tires into the engine of an aircraft. The deflector has two vertically mounted plates that have oblique stepped surfaces facing the tires.

2 Claims, 3 Drawing Sheets

SUPER DEBRIS DEFLECTOR

BACKGROUND OF INVENTION

When an aircraft travels along a runway, it will inevitably run over debris such as a screw, nut etc., that will be lofted toward the engines. If the debris is injested by the engines, severe damage could occur, resulting in costly repairs and possibly endangering the safety of the plane.

Glasenapp, U.S. Pat. No. 4,389,029 and Bowdy, U.S. Pat. No. 4,681,285, disclose horizontally mounted deflectors for preventing engine inhalation of water. Because of the narrow profile, which is required to allow the tires to fit within the wheel wells, these deflectors do not trap all of the debris created by the tires. In addition, the horizontal deflectors tend to direct the debris horizontally toward the fuselage, where solid articles could ricochet back into the engines.

SUMMARY OF INVENTION

This invention is a debris deflector having two S-shaped plates vertically mounted to the landing gear of an aircraft, aft of the wheels. The plate sides facing the wheels, have a plurality of steps extending along the surface of the plates at a angle oblique to the runway. The steps catch and laterally deflect oncoming debris, preventing the debris from horizontally discharging from the plates and ricochetting off the fuselage.

It is an object of this invention to prevent foreign matter from being thrown by the wheels of an aircraft into its engines.

It is an object of this invention to provide a debris deflector profile, that allows it to retract into the wheel well of an aircraft.

It is an object of this invention to provide an inexpensive, simple debris deflector that can be easily retrofitted onto existing aircraft.

DESCRIPTION OF DRAWINGS

The objectives and advantages of the invention will become more apparent to those skilled in the art after considering the following detailed description and accompanying drawings, wherein.

DETAILED DESCRIPTION OF INVENTION

Figure 1:
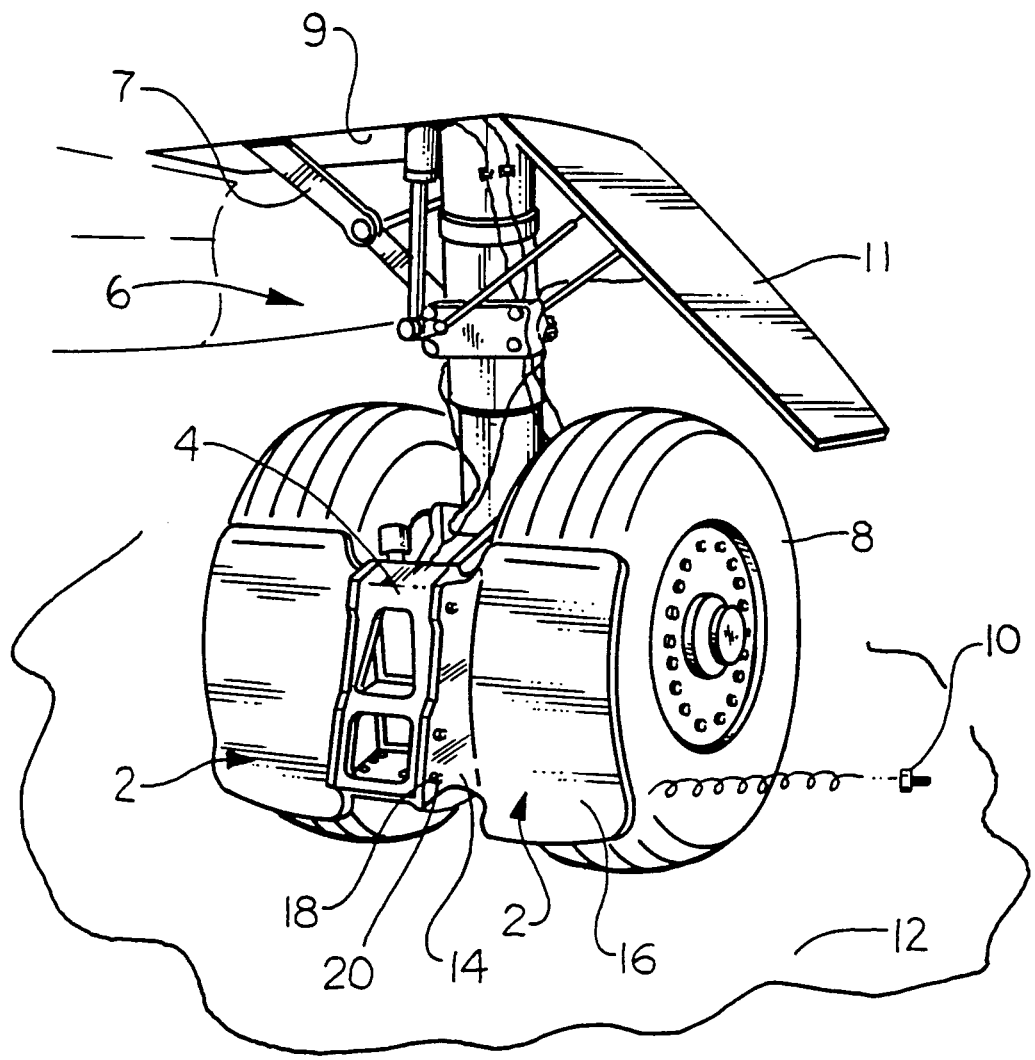
FIG. 1 is a perspective view showing a debris deflector mounted to a landing gear.

Referring to the drawings more particularly by reference numbers, FIG. 1 shows two debris deflectors 2, mounted to a housing 4 that is attached to the landing gear 6 of an aircraft. The landing gear 6 has wheels 8 that can potentially run over and discharge debris 10 that is lying on the runway 12. The deflectors 2 are placed aft of the wheels 8 in a position essentially vertical to the runway 12.

When actuated, landing gear retractor 7 retracts the landing gear 6 into wheel well 9 by swinging the landing gear 6 upwards and inboard, in a manner well known in the prior art and presently utilized on the DC-9 ®/MD-80 ® line of aircraft, manufactured in Long Beach, Calif. by McDonnell Douglas Corporation. Of course, any other type of known landing gear retraction means could be employed without exceeding the scope of this invention. When the landing gear 6 is completely retracted, cover door 11 swings closed over the wheel well, thereby presenting an aerodynamic surface for efficient flight. In the retracted mode, the debris deflector 2 is nested completely within the wheel well 9.

Each deflector 2 has a base 14 and a plate 16 extending essentially perpendicular to the base 14. The base 14 has a plurality of apertures 18 that allow fastening means 20 such as screws or bolts, to attach the deflector 2 to the housing 4.

Figure 2:
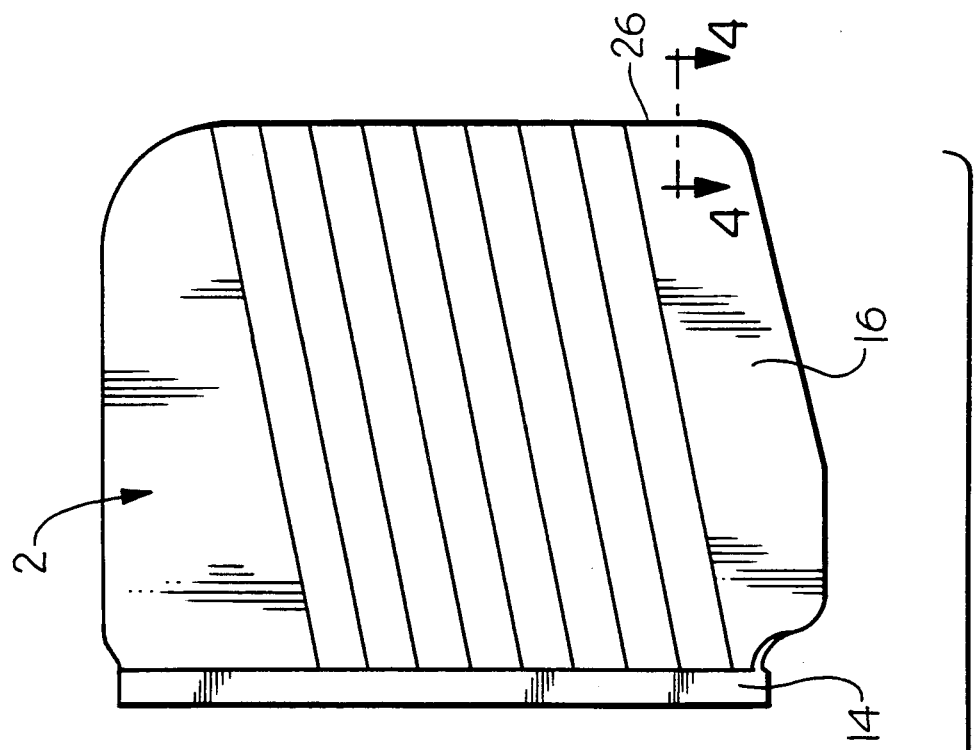
FIG. 2 is a debris deflector showing a plurality of oblique steps on the inside surface of the deflector plates.
Figure 2:
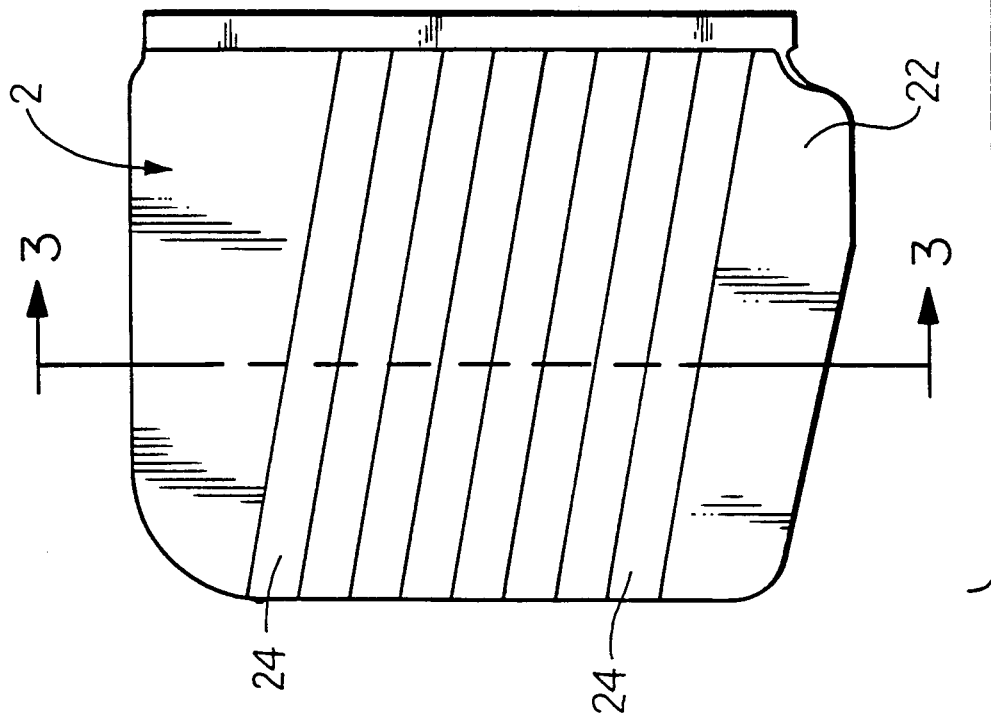
Figure 3:
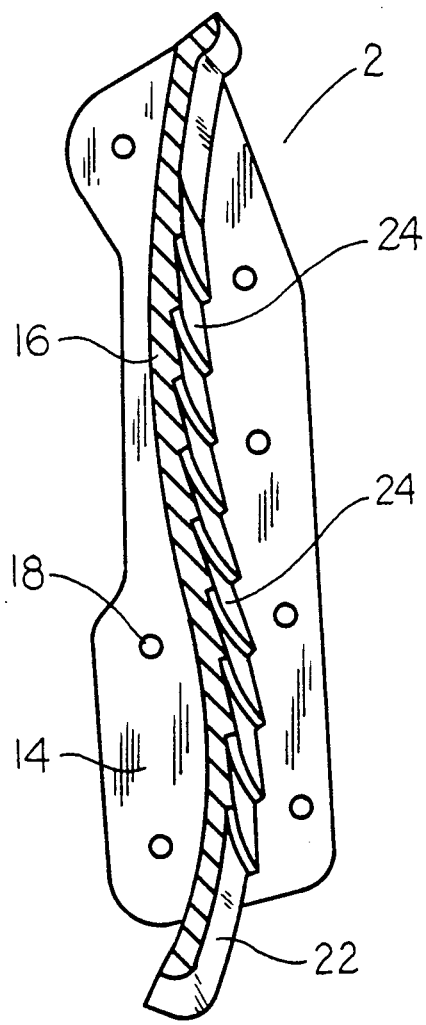
FIG. 3 is a cross-sectional view of FIG. 2 taken at line 3—3, showing a plurality of steps extending along an S-shaped deflector plate.

As shown in FIGS. 2 and 3, the side 22 of the plate 16 that faces the wheel 8, has a plurality of curved steps 24 that extend across the surface at an angle oblique to the runway 12. When debris 10 is discharged by the wheels 8, either the deflector 2 deflects the debris 10 vertically toward the runway 12, or the debris 10 is caught by the steps 24, which laterally discharge the debris 10 from the plate 16. The oblique angle of the steps 24 allows the debris 10 to maintain lateral velocity until it reaches the end of the panel 14, insuring that the debris 10 is laterally deflected.

Figure 4:
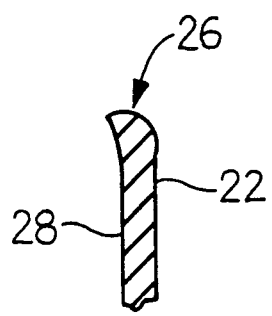
FIG. 4 is a cross-sectional view of FIG. 2 taken at line 4—4, showing the edge of a deflector.

As shown in FIG. 3, the plate 16 may have an S-shape that fits closely to the contour of the wheels 8. The S-shape reduces drag while still providing a large area to trap oncoming debris 10. The plate 16 may have a lateral curvature extending from the base 14, conforming to the contour of the wheel 8. To prevent vortices on the end of the plates 16, the plate edges 26 can have a radius on the side 22 facing the tires 8, that terminates at a right angle with the opposite side 28, see FIG. 4.

By positioning the plates 16 vertically, the deflector 2 is capable of fitting into present wheel wells, while providing greater debris 10 protection. The vertical orientation allows the plate to have a full profile covering a substantial portion of the aft vertically oriented surface of the wheel, such full profile being maintained even when the wheel is retracted into the wheel well 9. When tested, the super debris deflector 2, with its unique oblique stepped plates 16, provided greater debris protection, created in part by the lateral deflection of any oncoming debris 10 discharged by the wheels 8. It is desirable to mold the plates 10 out of a polyether urethane polymer sold by Uniroyal under the tradename L-325 ADIPRENE, which is resilient, light in weight, and lower in cost, while still providing the necessary strength to deflect any debris 10.

What is claimed is:

1. A debris deflector for an aircraft landing gear, wherein said landing gear includes a housing attached thereto and has wheels that can discharge debris from a runway, said deflector comprising:

a) at least one plate mounted to said housing aft of said wheels, in a position essentially vertical to said runway, said plate being S-shaped such that it conforms closely to the contour of said wheels;

b) said plate having a surface which faces said wheels, said surface having a plurality of steps extending thereacross at an angle oblique to said runway for ensuring that said debris is discharged laterally from said deflector;

c) said plate having a full profile and being substantially as wide as or wider than the width of the wheel, and said full profile being maintained when said plate and said landing gear are fully retracted into a wheel well.

2. A debris deflector for an aircraft landing gear, wherein said landing gear includes a housing attached thereto and has wheels that can discharge debris from a runway, said deflector comprising:

a) at least one plate mounted to said housing aft of said wheels, in a position essentially vertical to said runway;

b) said plate being S-shaped such that it conforms closely to the contour of said wheels and having a plurality of steps extending across the surface of said plate that faces said wheels, said steps extending across said plate at an angle oblique to said runway; and c) said plate having a full profile and being substantially as wide as or wider than the width of the wheel and being fully retractable into a wheel well.

* * * * *